(12) United States Patent  
Christ

(10) Patent No.: US 7,351,177 B2
(45) Date of Patent: Apr. 1, 2008

(54) SERIES OF GEARBOXES

(75) Inventor: Michael Christ, Hattingen (DE)

(73) Assignee: Sew-Eurodrive GmbH & Co. KG., Bruchsal (DE)

( * ) Notice: Subject to any disclaimer, the term of this patent is extended or adjusted under 35 U.S.C. 154(b) by 0 days.

(21) Appl. No.: 10/487,133

(22) PCT Filed: Aug. 22, 2002

(86) PCT No.: PCT/EP02/09403

§ 371 (c)(1),
(2), (4) Date: Feb. 20, 2004

(87) PCT Pub. No.: WO03/019041

PCT Pub. Date: Mar. 6, 2003

(65) Prior Publication Data

US 2004/0198543 A1     Oct. 7, 2004

(30) Foreign Application Priority Data

Aug. 23, 2001   (DE) ................. 101 41 435
May 16, 2002   (DE) ................. 102 21 893

(51) Int. Cl.
*F16H 1/32*     (2006.01)
(52) U.S. Cl. .............. 475/168; 475/176; 475/177; 475/178
(58) Field of Classification Search ........... 475/168, 475/176, 177, 178, 903, 904
See application file for complete search history.

(56) References Cited

U.S. PATENT DOCUMENTS

| | | | | |
|---|---|---|---|---|
| 3,453,907 A | * | 7/1969 | Noguchi et al. | 475/176 |
| 4,050,331 A | * | 9/1977 | Braren | 475/168 |
| 4,679,465 A | * | 7/1987 | Goto et al. | 475/180 |
| 4,898,065 A | * | 2/1990 | Ogata et al. | 475/179 |
| 5,222,922 A | * | 6/1993 | Takahashi et al. | 475/178 |
| 5,290,208 A | * | 3/1994 | Minegishi | 475/178 |
| 5,292,289 A |   | 3/1994 | Ogata et al. | |
| 5,651,747 A | * | 7/1997 | Minegishi et al. | 475/176 |
| 6,440,030 B1 | * | 8/2002 | Minegishi et al. | 475/178 |

FOREIGN PATENT DOCUMENTS

EP      0 286 760 A1     10/1988

(Continued)

OTHER PUBLICATIONS

International Search Report in PCT/EP02/09403 dated Nov. 12, 2002.

(Continued)

*Primary Examiner*—David D. Le
(74) *Attorney, Agent, or Firm*—Marshall, Gerstein & Borun LLP

(57) ABSTRACT

A series of gear systems is disclosed, each of which comprises least one double-shaft, reversible planetary stage including a combination of an open positive gear system having lantern-gear teeth and an output system. "$z_1$" represents the lantern-gear arrangement, and a number of teeth $z_2$ is assigned to at least one planetary gear. The series of gear systems comprises several variants of size categories. Each of the several variants comprises internal gears in which external rollers are seated in grooves such that the intervals are different in the different variants and are produced by the regular elimination of individual external rollers.

11 Claims, 7 Drawing Sheets

FOREIGN PATENT DOCUMENTS

| | | |
|---|---|---|
| EP | 0 556 587 A1 | 8/1993 |
| EP | 0 687 837 A2 | 12/1995 |
| JP | 63254252 A * | 10/1988 |
| JP | 03009148 A * | 1/1991 |
| JP | 11-000792 | 1/1999 |
| JP | 11-000793 | 1/1999 |

OTHER PUBLICATIONS

International Preliminary Examination Report in PCT/EP02/09403 dated Jun. 11, 2003 (translation).

* cited by examiner

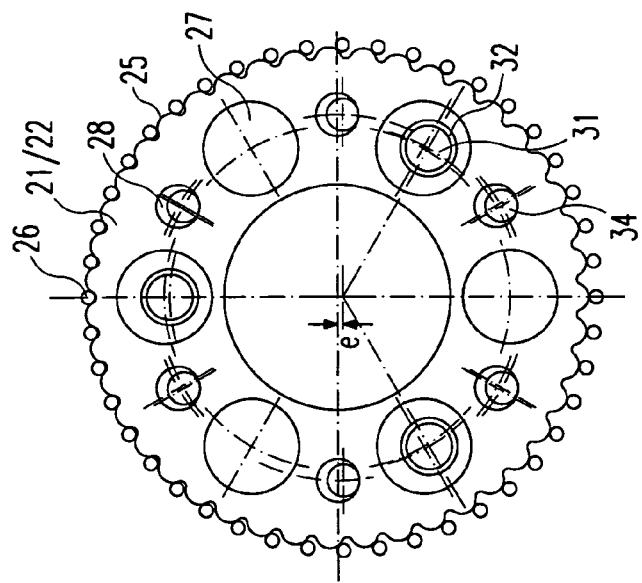
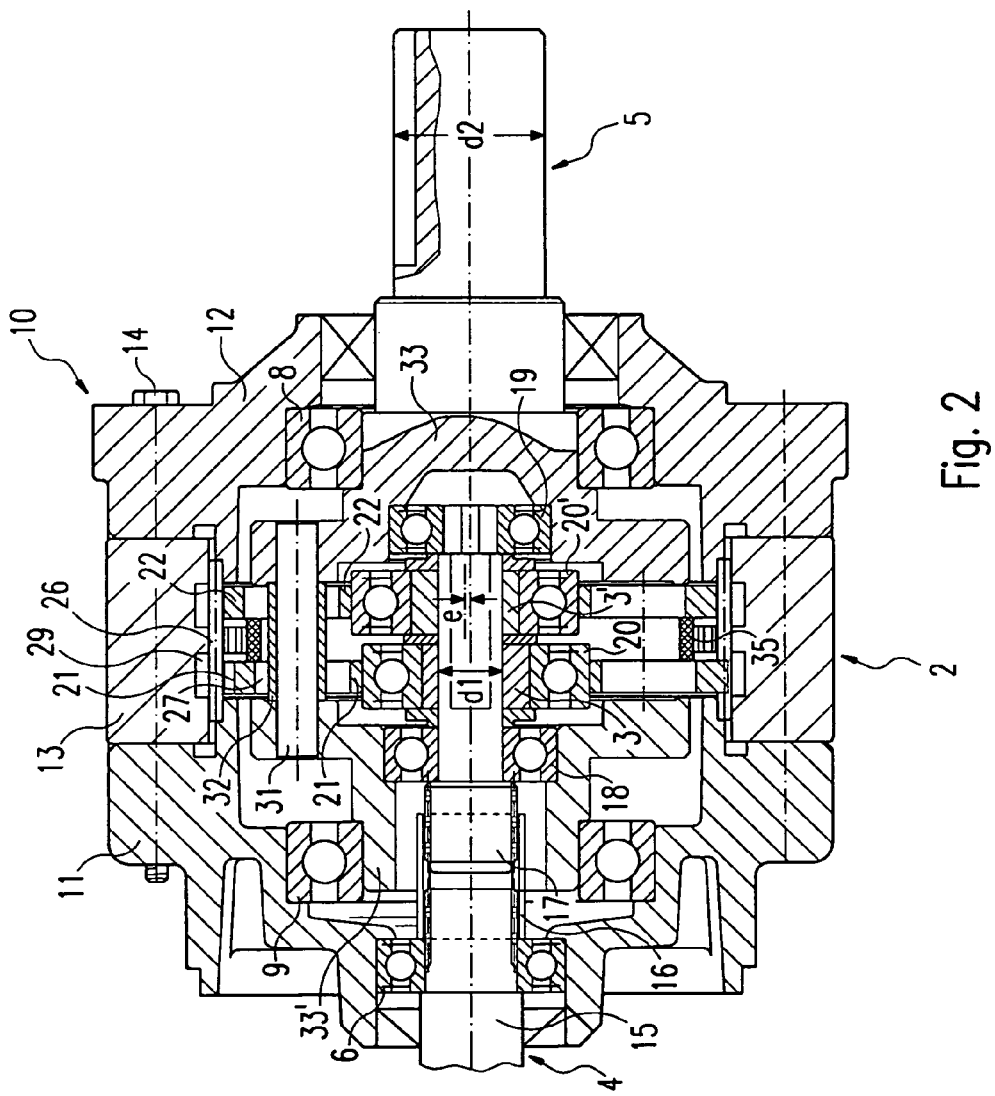

US 7,351,177 B2

SERIES OF GEARBOXES

RELATED U.S. APPLICATIONS

This is the U.S. national phase of International Application No. PCT/EPO2/09403 filed Aug. 22, 2002 and designating the U.S., the entire disclosure of which is incorporated herein by reference.

FIELD OF THE INVENTION

The invention relates to a serises of gearboxes consisting of a plurality of gear systems, each of which comprises at least one double-shaft, reversible planetary stage comprising a combination of an open postive gearbox having lantern-gear teeth and an output system.

BACKGROUND OF THE INVENTION

Such gear systems are known, for example, from the published German document by H. W. Muller (Springer Verlag 1998) entitled "Die Umlaufgetriebe". Their principle of operation will now be explained with reference to the accompanying FIG. 1, which will also serve to define the terms used thereafter.

BRIEF SUMMARY OF THE INVENTION

As shown in FIG. 1, a stationary housing 10 is provided, within which are concentrically disposed a rotatable first shaft 4 and second shaft 5. The first shaft 4 bears an eccentric element on which is rotatably mounted a planetary gear 21. The planetary gear 21 rolls against an internal gear 2 that is fixedly connected to the housing 10, in which process the teeth 25 of the planetary gear mesh with the teeth 26 of the internal gear 2. The planetary gear 21 is non-rotatably connected to the second shaft 5 by way of an output system 30, so that the rotation of the planetary gear 21 as it rolls against the internal gear 2 is transmitted to the second shaft 5 despite the eccentricity of the rotational movement of the planetary gear 21. The transmission ratio relating the angle (or speed) of rotation of the first shaft 4 to that of the second shaft 5 is determined by the number $z_1$ of teeth 26 on the internal gear 2 and the number $z_2$ of teeth 25 on the planetary gear 21.

Double-shaft planetary systems of this kind are customarily constructed as a combination of an open positive gearbox having lantern-gear teeth and an output system comprising a cardan shaft or a parallel-pin gearing or a parallel cam gearing, or else an output system based on the double-crossover principle. In this case the teeth 26 of the internal gear consist of external rollers on the lantern-gear arrangement, while the teeth 25 of the planetary gear 21 are the "teeth" on a disk in the shape of an epi-hypo- or pericycloid curve, or the meshing is achieved by a toothed rod. To put it more abstractly, the teeth are produced with a tool having an infinitely large pitch-circle diameter, which rolls along a base circle. In this last case the tooth arrangement is an involute.

It should be emphasized at this juncture, however, that the present invention also applies to gear systems in which the input and output shafts are not parallel; that is, angular gearings, bevel gearings with straight or spiroid tooth arrangements and the like are included. The teeth can also be modified with flank, foot and/or head corrections so that in a practical, not-precisely-mathematical implementation smooth running is optimized, while noise generation and/or engagement and disengagement impacts are minimized.

It will be evident from the above that the manufacture of such gear systems involves a not inconsiderable amount of effort.

In all gear systems, and hence also in those of the kind described above, the problem is encountered that—depending on the particular application—there must be a particular degree of stepping up (or down), the gear system must be able to transmit a particular maximal moment of torque, and during transmission of this torque it is required that neither the ripple in the torque (corresponding to roughness in running) nor the noise generation should exceed a certain maximum value.

It has proved to be the case that a "group classification" can be made according to which, although the various requirements cover a wide range, there are a finite number of gear systems that will have the characteristics demanded by the users. Nevertheless, the effort of construction is still considerable when each of the gear systems is produced individually. For this reason attempts are being made to develop series of gearboxes in which individual components, such as the housing or sections thereof, the gear-wheels, shafts or the like can be used in several ways. In the simplest case, for example, in one and the same housing pairs of gearwheels with different numbers of teeth but a uniform total gearwheel diameter are installed, to achieve various transmission ratios.

It is the object of the invention to provide a series of gearboxes of the kind cited at the outset in which, with the smallest possible number of individual components, the largest possible number of different properties can be obtained by simple means, in particular with regard to the transmission gradations, as well as to disclose a method of manufacturing such a series of gearboxes.

In particular, according to a first aspect of the present invention the object is achieved by a series of single- or multiple-stage gearboxes constituting a structural unit in at least one size category, which in turn comprises one or more variants. Each variant comprises at least one gear stage of the double-shaft, reversible planetary type consisting of a combination of an open positive gearbox having lantern-gear teeth, at least one planetary gear and an output system. The lantern-gear tooth arrangement can be specified by a number z1 of rollers. A number of teeth z2 can be assigned to at least one planetary gear. For a unit of a given size, a matrix can be formed for the variants within this size category, by assigning the index i to the value z1 and the index j to the value z2 : the result is the matrix M index ij =(z1 index i, z2 index j), in particular a matrix doubly indexed with ij. With index k the matrix comprises identifiable subsequences S index k. Here the variants within a given subsequence S index k are constructed with grooves in a housing component to serve as bearings for the external rollers at a relative angle p×360°/N, where p is a natural number, such as 1, 2, 3, 4 or the like, and N is a natural number; they are identifiable by a particular number z1, such that p=N/z1, and comprise different tooth numbers z2 such that the differences z 1 -z2 represent an arithmetic sequence, in particular a finite and non-trivial arithmetic sequence.

While the teeth of the internal gear are generally referred to as rollers throughout the specification, the roller may also be a rod, as the term rod is also used in the art to designate a bar shaped element of a lantern gear that engages the teeth of a spur gear.

In the claims, any one gearbox of the aforementioned matrix is termed a "first"gearbox; any other gearbox of said matrix is termed a "second" gearbox; and any gearbox of said matrix differing from said "first" and "second" gearboxes is termed a "third" gearbox. As discussed in detail elsewhere in this specification, the respective gears associated with the gearboxes of the matrix may differ with respect to the number of groove positions $z_0$, the number of rods or rollers $z_1$, the number of teeth $z_2$, as well as the proportion p of groove positions that accommodate rods.

To distinguish between these differing variables, the variables $z_0$, $z_1$, $z_2$, are provided with a second subscript in the claims that is indicative of the "first," "second," or "third" gearbox. Similarly, the variable p is provided with a first subscript, i.e., $p_1$, $p_2$, $p_3$, in the claims that is indicative of the "first," "second," and "third" gearbox. In other words, for example, $Z_{0,1}$, $Z_1$, $Z_{2,1}$ and $P_1$ identify the variables $z_0$, $z_1$, $z_2$ and p with regard to any "first" gearbox of the aforementioned matrix.

The matrix M index ij preferably comprises a number between five and ten of such subsequences, and it is particularly preferred for it to be composed only of such subsequences.

In the case of variants within a given size category that are designed as a two- or multiple-stage gear system, for every two gear stages a matrix Mij is set up on the basis of subsequences, such that at least one subsequence is provided. Alternatively or in addition, in both gear stages the number z1 is the same, and the cam plates with the tooth number z2 can be used and/or manufactured in common for both gear stages.

Within a given size category, for every two gear stages a matrix M index ij is set up on the basis of subsequences, such that all the subsequences in both gear stages are shared subsequences.

Preferably within a given size category at least two variants comprise different tooth numbers, the number N of grooves serving as bearings for the external rollers is a prime factor or can be represented as the product of two or more prime factors, and at least two variants comprise different numbers z1 of lantern-gear teeth or external rollers, such that in these variants the number z1 of lantern-gear teeth equals the number N of grooves, or is equal to a (combinatorially possible) subproduct of these prime factors.

The number z1 of external rollers corresponds to N/p, so that only those particular grooves for which external rollers are provided are formed and processed in the housing part.

The double-shaft, reversible planetary-drive stage comprises on the input side, in a first embodiment of the invention, a rotating plate shaft. It can also be constructed as an eccentric gear stage or as a cycloid gear stage, in which case there is connected to the plate shaft an eccentric component that drives at least one cam plate. In the case of a lantern-gear arrangement, to serve as lantern-gear teeth a number of external rollers equal to z1 are disposed in a circle, and these interact with a number of teeth equal to z2 that are associated with the at least one cam plate, so that their rotational movement is transmitted to the output drive shaft; the rollers are supported in a housing part having a number of grooves.

Preferably within a given size category, at least two variants are provided with the same housing part having grooves to serve as bearings for the external rollers. Preferably the same external rollers are employed by both gear stages.

Preferably in at least one variant the output drive shaft is simultaneously designed to carry a cycloid plate for an additional cycloid gear stage, so as to achieve a zero-backlash connection between the two cycloid gear stages.

Preferably the variants of a subsequence in which z1 decreases exhibit an increasing eccentricity of the cycloid gear stages and/or a decreasing diameter of the driving pins and/or a non-decreasing number of cam plates. This measure improves the running characteristics of the gear system.

Preferably the entire series of gearboxes intended for use with the same full-cycle transmission comprises only variants in which the numerical difference |z1-z2| is as small as possible.

When special sheaths are used for the first teeth numbered z1, preferably an internal gear is used that comprises grooves to receive first, thick external rollers with diameter d, whereas for the remaining teeth numbered z1, which are larger than the first teeth numbered z1, the external rollers are thinner than the first, thick ones, and these thinner external rollers are set into correspondingly thick sheaths with diameters d, so that the thick sheaths fit precisely into the grooves provided to receive them, in particular are inserted into bores in the internal gear.

Alternatively, in accordance with a second aspect of the present invention the aforementioned object is also achieved by a series of gearboxes comprising a plurality of gearings, each of which comprises at least one gear stage of the double-shaft, reversible planetary type comprising a combination of an open positive gearbox with lantern-gear teeth and an output system; the members of the series belong to one or more size categories and in each case consist of a housing within which are disposed internal gears formed by a number $Z_0$ of grooves and a first number $z_1$ of external rollers disposed therein; the several variants within the size category form various transmission ratios and/or transmit various maximal moments of torque between a first shaft and a second shaft concentric therewith, with planetary gears, in particular cam plates, each of which comprises a second number $z_2$ of teeth and is nonrotatably connected to the second shaft by way of the output drive system. In a first alternative of this arrangement each of the several variants comprises planetary gears differing from one another in the second number $z_2$ of teeth, and the difference $z_1$-$z_2$ between the first number $z_1$ and the second number $z_2$ of the particular planetary gears of the variants forms an arithmetic sequence, in particular a non-trivial arithmetic sequence. In a second alternative, the number $z_0$ of the grooves is a product of a number k<1 of prime factors and each of the several variants comprises internal gears, in the grooves of which the external rollers are seated in different patterns, formed by regularly eliminating individual external rollers or groups of external rollers at equidistant intervals that differ for each variant, and/or the several variants are again constructed according to the first alternative, i.e. each of the several variants comprises planetary gears differing from one another in the second number $z_2$ of teeth, and the difference $z_1$-$z_2$ between the first number z1 and the second number $z_2$ of the particular planetary gears of the variants forms an arithmetic sequence, in particular a finite non-trivial arithmetic sequence.

In the first alternative, then, external rollers are seated in all the grooves, and the teeth of the internal gears roll over these. The gearbox series is finely graded because the difference of tooth number forms an arithmetic sequence; therefore standard transmissions can be varied by suitable choice of the tooth number in such a way as to produce the same planetary transmissions according to the following formula:

$$i_{s2} = n^* z2/(n^*(z_2-z_1)), \text{ where } n=1, 2, 3, \ldots$$

The following table shows an example of this:

|  | $i_{s2}$ (full-cycle transmission) | | | |
| --- | --- | --- | --- | --- |
|  | −8 | −8 | −8 | −8 |
| $z_1$ (external rollers) | 9 | 18 | 36 | 72 |
| $z_2$ (number of planetary-gear teeth) | 8 | 16 | 32 | 64 |

In the second alternative solution in accordance with the invention, which can be used as a supplement to the first alternative, not all the grooves in the internal gear are "filled" with external rollers, or else not all of the grooves that would be present in a regular arrangement are provided, so that the number of teeth in the internal gear is reduced. This is exemplified as follows:

$z_1$ (number of external rollers)=36=const.

|  | $i_{s2}$ (full-cycle transmission) | | | | |
| --- | --- | --- | --- | --- | --- |
|  | −8 | −11 | −17 | −35 | −71 |
| $z_1$ (external rollers) | 36 | 36 | 36 | 36 | 36 |
| $z_2$ (no. of planetary-gear teeth) | 32 | 33 | 34 | 35 | 71 |

This table takes account of the fact that every second external roller in the total of 72 external rollers ($i_{s2}$=71) can be omitted at the circumference. Hence in this case, again, one obtains 36 external rollers. Therefore the associated housing part can be used in several ways while remaining within a single size category. It can then also be used for a cam plate with 71 teeth.

To generalize, instead of every second external roller it is possible, for example, to employ only every $n^{th}$ external roller, as long as the number of external rollers has an appropriate integer divisor. Thus, for example, 2 out of 3 external rollers can be omitted, or 3 out of 4, and so on.

Conversely, a housing part can also be used in which, for example, instead of 36 external rollers only 18 or 12 external rollers are employed. The associated cam plate then comprises 12 or 11 teeth. As a generalization, then, as many external rollers can be omitted as will leave an integral number $z_1/n$ remaining, where n=2, 3, 4, . . . .

It will be evident from the above that the present invention in its first alternative is independent of whether a lantern-gear tooth arrangement is provided or another kind of tooth arrangement, in which no teeth can be simply "left out".

In a first preferred embodiment the drive system is constructed either as a parallel-pin gear system with a transmission ratio of m=1 or as a parallel crank system that is equivalent to a parallel-pin system, or else as a drive system according to the double-crossover principle. The implementations described below are generally based on a parallel-pin gear system, but the expert active in this area will be able, merely with reference to the information given in textbooks, to convert this into a parallel crank system or a drive system according to the double-crossover principle.

Preferably the gear stage (constructed as a planetary train) is a cycloid gearing in which the planetary gear has the form of a cam plate. Such gear systems operate with especially high efficiency and are far from being self-locking, so that they can be used in both directions (stepping up and stepping down). Furthermore, such gearings can be made so as to exhibit extremely little play.

If only a single planetary gear is used, out-of-balance states can result, which should be avoided at relatively high rates of rotation. Therefore it is preferable for each planetary gear to be constructed as a group of n identical planetary gears, which to reduce imbalance are disposed on plate shafts or eccentric supports offset from one another by 360°/n. The greater the number of "sub-planetary" gears provided to constitute the planetary gear, the quieter the operation of the system will be.

The series of gearboxes preferably comprises a plurality of planetary gears with substantially identical circumferential dimensions, in particular with the same tooth numbers $z_2$ and diameters but different thicknesses (or widths) so as to support variously high moments of torque. Alternatively or additionally, the planetary gears (while having substantially identical circumferential dimensions) can each be composed of several planetary gears in a stacked arrangement. These two possibilities can also be employed cumulatively, so that to form a plurality of variously thick (wide) planetary gears only a few individual gears differing from one another need to be manufactured, or kept in stock by the manufacturer, so that where the loading capacity of the planetary gear is concerned, it is possible to produce an arbitrary number of planetary gears having increasing loading capacity.

Preferably the series of gearboxes comprises a plurality of internal gears with substantially identical inner circumferential dimensions, in particular with the same number of grooves and the same inside diameter, but having different thicknesses so as to support variously high moments of torque; again, as in the case of the planetary gears, the internal gears can be composed of several internal gears arranged in a stack. The advantages that can thus be achieved correspond to those described above in the context of the planetary gears.

Preferably the housings of the series of gearboxes are so constructed that additional gear stages can be incorporated or added. These additional stages can be disposed ahead of, within or after the existing stages and can comprise, for example, spur-pinion stages or angular-gear stages, in particular spur-toothed or spiroidally toothed angular-gear stages.

In one preferred alternative the housing part can be used for two (planetary gear) stages. The housing part in this case forms a housing section in the region of the planetary gears of the first and second stage. The number of teeth on the cam plate in the first stage can be different from that in the second stage. Again—as explained above—this arrangement also makes it possible to use fewer external rollers, so that only every second, third or fourth (and so on) roller is seated in the grooves. Here it is preferable to provide a single internal gear (although, where appropriate, one composed of several sections) with the same number of grooves for several gear stages.

The moments of torque to be transmitted in the first stage are different from those in the second stage. Therefore it is preferable for the width of the planetary gears to be smaller in the first stage than in the second stage. Accordingly, the casing parts with external rollers that form the internal gears are made correspondingly narrower or wider. One of the substantial advantages thereby achieved is that the cam plates employed in the first and in the second stage can be produced with the same number of teeth, on the same machine and in a single processing phase, although the widths of the individual planetary gears can be different. Alternatively—as has been explained above—each planetary gear can be composed of several narrower planetary gears, in which case the above-mentioned additional advantages regarding reduction of the diversity of parts are obtained.

The arithmetic sequence of the differences in tooth numbers is preferably a first-order sequence (1, 2, 3 . . . ). The result is an especially fine gradation of the possible multiplication factors. However, it should be explicitly pointed out at this point that not every multiplication factor for which manufacturing means are available is required in practice; indeed, the users tend to demand relatively fine gradations in certain ranges while being entirely satisfied with larger gradations in other (performance) ranges. Hence the idea underlying the invention also comprises series of gear systems in which the individual transmission ratios are derived from the above-mentioned arithmetic series of gradations, but certain intermediate values or groups of intermediate values can be produced as "theoretically possible values" that are not, however, implemented in the gearbox series actually supplied.

Preferably the grooves are constructed such that when some external rollers are eliminated, the diameter of the rollers that remain can be greater. That is, the omission of some rollers leaves space for the remaining rollers to have larger dimensions, which increases the efficiency of the gear system as well as the maximal transmissible torque, although it is still possible to use the very same housing parts or internal gears, with the grooves already present therein.

When manufacturing housing sections in which grooves are formed, preferably the grooves themselves have the same diameter, but the grooves are disposed at different diameters so that different eccentricities can be implemented. Hence with one and the same tool various internal gears can be produced. Again, because the width of the grooves is identical, the same external rollers can be used.

Preferably the gearbox series comprises a plurality of eccentric elements that can be non-rotatably connected to the first shaft or are formed integrally therewith, so that planetary gears with the same bearing dimensions can be mounted on the eccentric elements so as to have different eccentricities with respect to the first shaft. Thus the first shaft is preserved, so that this component, which is quite laborious to produce, can be manufactured in large quantities.

Preferably the first shaft is subdivided into two sections, which are non-rotatably connected to one another by a connecting device. One section is a motor shaft leading out of the housing and the other, seated in the housing, is a planetary-gear carrier on which the eccentric elements are mounted. The rotationally stable connection between the two shaft sections is achieved by a connecting device that in particular can be designed as a plug-in connector employing interlocking teeth, knurling, channel toothing, force-fitting (cylindrical or conical), or is attached by adhesive, which enables especially rapid and simple assembly. Furthermore, various motors or other apparatus to be connected to the gear system can be coupled therewith by connection to motor shafts adequately dimensioned for the particular application, while in all other respects the planetary-gear carriers remain the same. This results in a further reduction of the number of parts required.

The second shaft is preferably designed as a planetary-gear carrier for another planetary gear stage, when a multiple-stage gear system is demanded. Thus the keyed connection customarily used between the two gear stages is eliminated.

When the planetary gear train is constructed as a cycloid gearing, preferably a plurality of drive systems are provided in the gearbox series, which are used to transmit variously high maximal moments of torque. Customarily, however, in this arrangement the quietness of running is impaired thereby (as the maximal torque increases). Hence according to the customer's desires or the intended application, the particular drive system that is best suited to the purpose can be selected.

The drive system preferably comprises driving projections, which are constructed in the case of a parallel-pin gear system as pins, in a parallel-crank system as cranks, and in a gear system according to the double-crossover principle as drive bolts. Such driving pins can very simply be mass-produced. For this arrangement, preferably there are provided a plurality of driving pins differing in diameter and in the eccentricity e of their axes, so that a great variety of gearings with different maximal moments of torque or with different noise levels while running can be manufactured. It is particularly advantageous for the number of driving pins to be divisible by 4, as this achieves quieter running. As the number of eliminated external rollers increases, the driving pins are preferably constructed with smaller diameter, which likewise achieves quieter running. Additionally or also alternatively, a larger number n of planetary gears or cam plates can be provided, disposed on eccentric elements offset from one another by 360°/n. This measure, in turn, reduces the running noise. Additionally or also alternatively, a small difference $z_2-z_1$ in the numbers of teeth $z_1$, $z_2$ is introduced, to increase the quietness of running still further.

This idea is surprising insofar as customarily the running noise of such a gear system is reduced exclusively by correcting the cam plate according to the state of the art.

It is furthermore preferable to provide a plurality of driving pins and/or cam plates and/or external rollers that are made of materials differing in solidity, and/or with surfaces of different hardness, so that gear systems that are otherwise identical can be constructed for transmitting elevated moments of torque by the employment of materials/surfaces of higher quality, without raising the price of the gearbox series as a whole.

Preferably a plurality of external rollers with different diameters are provided, which can be seated in the same grooves because the inside diameter of the latter is adjustable, for instance by means of sheaths, although they have the same outside diameter. Therefore—as indicated above—even though the manufacture of the grooves is simplified by use of a single tool, external rollers of various sizes can be used to support variously large moments of torque (with varying degrees of torque ripple), which brings a considerable advantage in the production of the series of gearboxes.

Altogether, then, the method in accordance with the invention is directed toward enabling manufacture to be completed with the smallest possible number of (special) tools. Furthermore, the manufacturing process is preferably undertaken for several parts at the same time. For example, several planetary gears are stacked up for processing (by milling, splicing, broaching or similar processing steps), which involves considerable simplifications for manufacture. The same also applies, of course, to the internal gears.

In the following, exemplary embodiments of the invention are explained with reference to figures, wherein

BRIEF DESCRIPTION OF THE DRAWINGS

FIG. 2 shows a longitudinal section through a first embodiment of such a planetary system with lantern-gear tooth arrangement;

FIG. 3 is a plan view of a planetary gear in which external rollers and carriers are indicated;

DETAILED DESCRIPTION OF THE INVENTION

Figure 1:
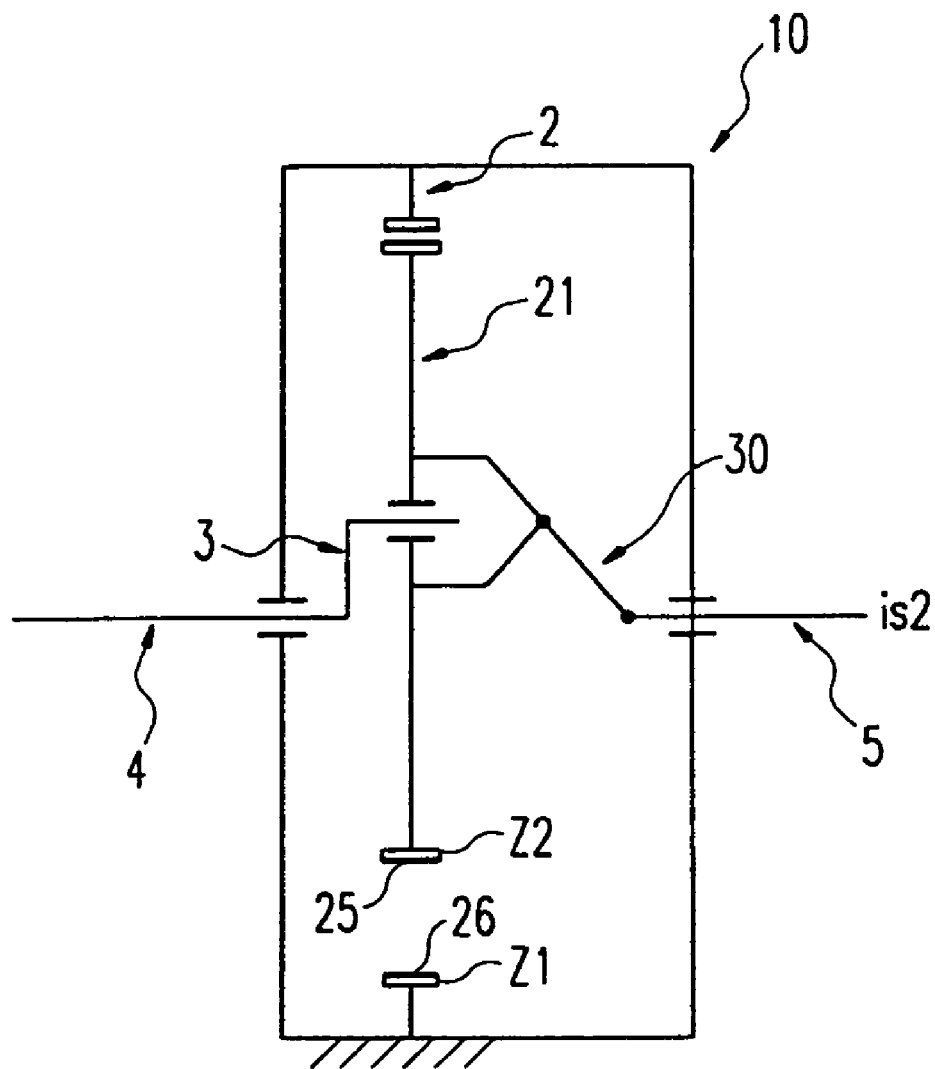
FIG. 1 is a schematic drawing of a double-shaft, reversible planetary gear system.

In the following description, the same reference numerals are used for identical parts or parts with identical actions.

As shown in FIGS. 2 and 3, a gear system belonging to the gearbox series in accordance with the invention comprises a housing 10 consisting of a first housing cover 11 and a second housing cover 12 with a internal-gear casing 13 between them, all of which are screwed together by studs 14. A first shaft 4 comprises a motor shaft 15, which extends out of the housing 10 and is seated in a first outer bearing 6, being sealed off from the exterior in the customary manner. The motor shaft 15 is non-rotatably connected to a planetary-gear carrier 17 by way of a connecting device 16, which in particular is constructed as a plug-in connector. This connecting device is designed with interlocking teeth, knurling or channel toothing, so that the connection can easily be created and released, or else employs (cylindrical or conical) force-fitting or an adhesive attachment. These types of connection are also very easy to create.

The planetary-gear carrier 17 is seated in an outer driving part 33 by way of a first carrier bearing 18, and in an inner driving part 33' by way of a second carrier bearing 19 at its end. The position of the first shaft 4 in the axial direction is fixed inasmuch as the first outer bearing 6 abuts against an outer shoulder of the motor shaft 15 and also against an inner shoulder of the first housing cover 11. The first carrier bearing 18 is apposed on its inner side, i.e. the side toward the motor shaft 15, to a shoulder of the planetary-gear carrier 17 as well as (on its outer side) to a shoulder of the inner driving part 33'. The second carrier bearing 19 is apposed on its side toward the motor shaft 15 to a shoulder of the planetary-gear carrier 17 and on its opposite side to the outer driving part 33. Thus the planetary-gear carrier 17 is connected to the driving part 33, 33' so as to be immovable in the axial direction.

On the planetary-gear carrier 17 are seated two eccentric elements 3, 3', which are spaced apart from one another by a spacer disk and are fixed in position in the axial direction by way of additional spacer disks on the first carrier bearing 18 and second carrier bearing 19, respectively.

On the eccentric elements 3 are seated planetary-gear bearings 20 and 20' on which are rotatably disposed a first planetary gear 21 and a second planetary gear 22, respectively. The eccentric elements 3 are off-center with respect to the axis of the first shaft 4 by an eccentricity value e, so that as the first shaft 4 rotates, they move around that shaft in an eccentric planetary motion.

As shown in FIG. 3, on their outer circumference the planetary gears 21, 22 comprise teeth 25, which mesh with external rollers 26 that are rotatably seated in grooves 29 formed partially in the internal-gear casing 13 and partially in the housing covers 11, 12. It will already be evident from the dimensioning according to FIG. 2 that it is possible to install external rollers with a diameter even larger than shown in FIG. 2, insofar as this concerns the region in which the planetary gears roll along the external rollers 26.

The planetary gears 21, 22 the teeth of which in this exemplary embodiment conform to an epi-, hypo- or pericycloid curve, comprise on one hand driving bores 28 and on the other hand, alternating therewith, through-bores 27. The through-bores 27 are sufficiently generously dimensioned that rods 31 on which are seated spacer sleeves 32 can pass through the bores without touching them. The rods 31 are fixedly connected to the outer driving part 33 at one end and to the inner driving part 33' at the other end, while the spacer sleeves 32 are situated between the driving parts 33, 33'. By this means the driving parts 33, 33' are connected to one another.

Within the driving bores 28 are seated driving pins 34 (see FIG. 3), which are likewise fixedly connected at their ends to the outer driving part 33 and the inner driving part 33'.

The axes of the driving pins 34 are offset from the central axes of the driving bores 28 by the value e, which specifies the eccentricity of the eccentric elements 3. The diameters of the driving bores 28 are larger, by 2×e, than the (outside) diameter of the driving pins 34, so that as the planetary gears 21, 22 rotate, the driving pins 34 roll along the inner walls of the driving bores 28, with the result that the rotation of the planetary gears 21, 22 is transmitted to a second shaft 5, which is non-rotatably connected to the outer driving part 33, preferably being made integral therewith. The driving parts 33, 33' and driving pins 34, together with the driving bores 28, thus form an output drive system 30.

To increase the stability of the arrangement, between the planetary gears 21, 22, in the vicinity of their outer circumferences, a spacer disk 35 is inserted so as to be concentric with the axis of the first shaft 4, so that the two planetary gears 21, 22 form a compact, rotating unit.

Figure 5:
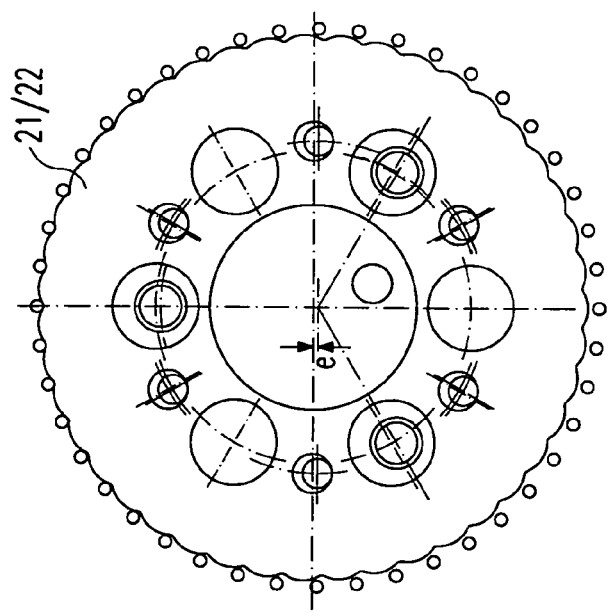
FIG. 5 is a view of the planetary gear in a representation like that in FIG. 3.
Figure 4:
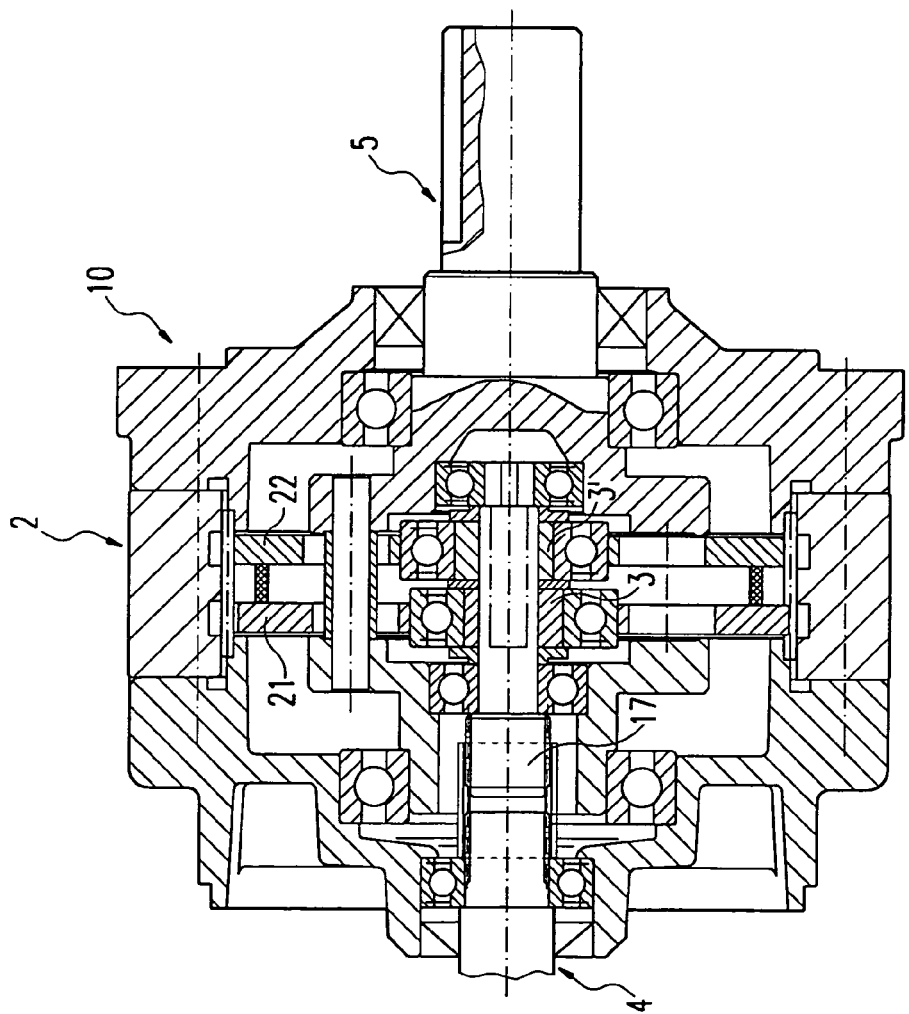
FIG. 4 shows a second embodiment in a view like that in FIG. 2.

The embodiment shown in FIGS. 4 and 5 differs from that according to FIGS. 2 and 3 in that the diameter of the housing 10 is greater, so that it can accommodate an internal gear 2 that is larger than in the embodiment according to FIGS. 2 and 3. This gear system thus belongs to a size category larger than shown in FIGS. 2 and 3. The eccentricity e is the same as in the embodiment according to FIGS. 2 and 3; hence the diameter of the planetary gears 21, 22 is likewise enlarged to adapt them to the larger internal gear 2. In this embodiment, therefore, it is possible to employ the same planetary-gear carrier 17, with the same eccentric elements 3, 3', as in the embodiment according to FIGS. 2 and 3. The shafts 4 and 5 are of larger dimensions, in correspondence with the higher maximal moment of torque that can be transmitted by this gear system, but this is not in itself necessitated by considerations of production technology; instead, it depends on the requirements of the parts that are to be attached (motor, machine to be driven).

Figure 7:
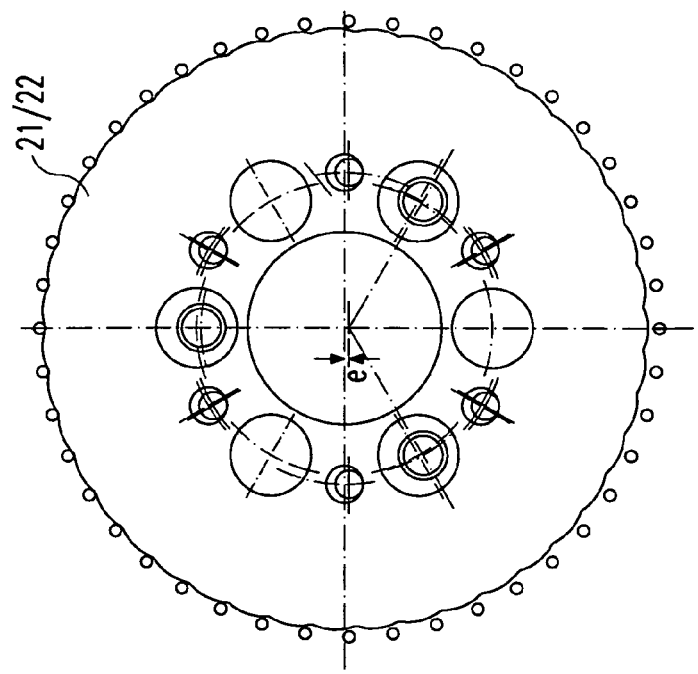
FIG. 7 is a plan view of a planetary gear, represented as in FIG. 3.
Figure 6:
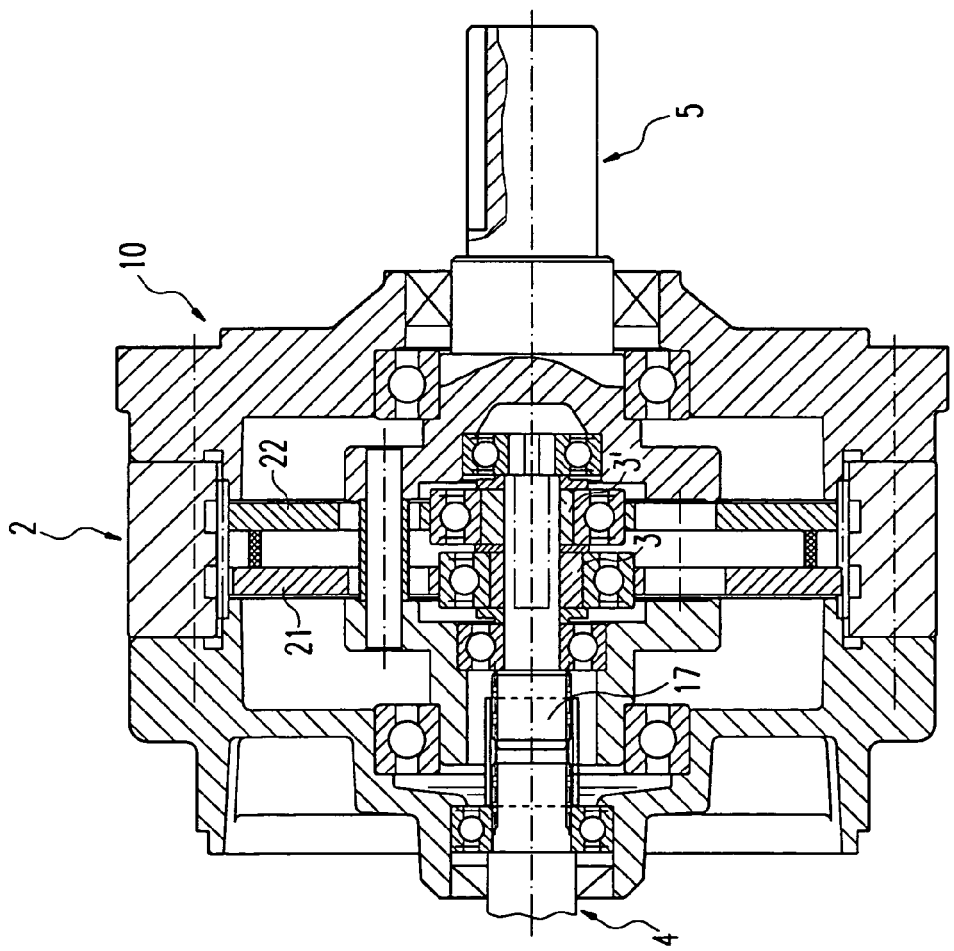
FIG. 6 shows a third embodiment of a gear system in a representation like that in FIG. 2.

The next size category is shown in FIGS. 6 and 7. Here, again, the dimensions of the housing 10, as well as those of the internal gear 2 and the planetary gears 21, 22, have been enlarged. The eccentricity e, as previously, is the same, resulting in the same effects that were previously described.

Figure 9:
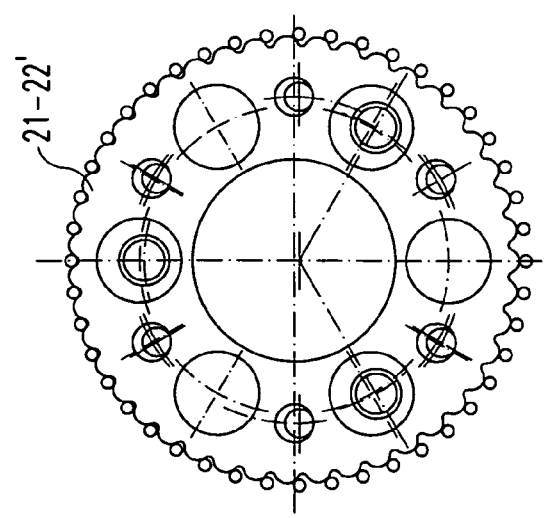
FIG. 9 is a plan view of the planetary gear in the system according to FIG. 8, represented as in FIG. 3.
Figure 8:
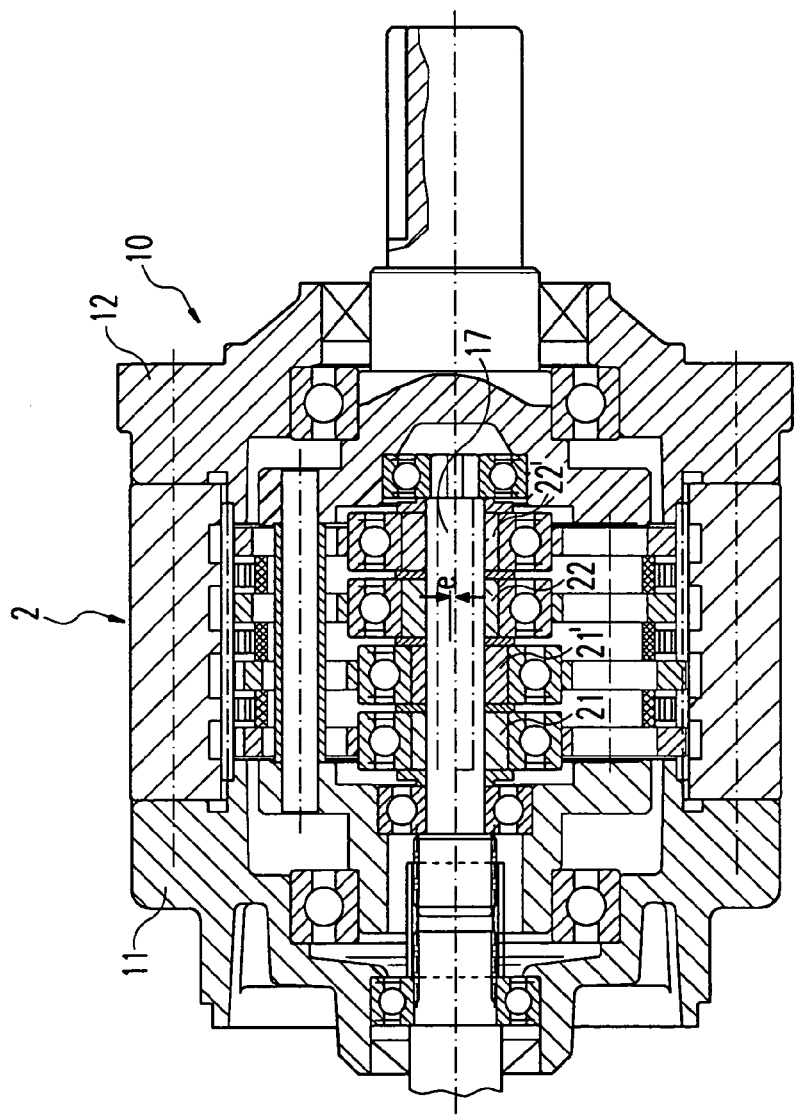
FIG. 8 shows another embodiment of a planetary gear system in a representation like that in FIG. 2.

In the variants shown in FIGS. 8 and 9, the internal gear 2 and the planetary-gear carrier 17 have been made longer than was the case in the embodiments previously discussed, so that now there is room for a total of four planetary gears 21, 21'; 22, 22'. In the illustrated embodiment these planetary gears are arranged as two pairs, which are offset from one another by 180° in order to reduce imbalance. It is of course also possible to arrange them so that each gear is offset from the next by 90°, which enables not only a dipolar but a quadrupolar compensation of the moment of inertia, i.e. of the imbalance. This exemplary embodiment makes clear that by varying the lengths (in the axial direction) of the internal gear 2 and the planetary-gear carrier 17, along with those of the driving pins 34 with the spacer sleeves 32, it becomes possible to employ more or fewer planetary gears 21, 22 without any need to alter the structure of the other components in order to accommodate these changes.

Figure 10:
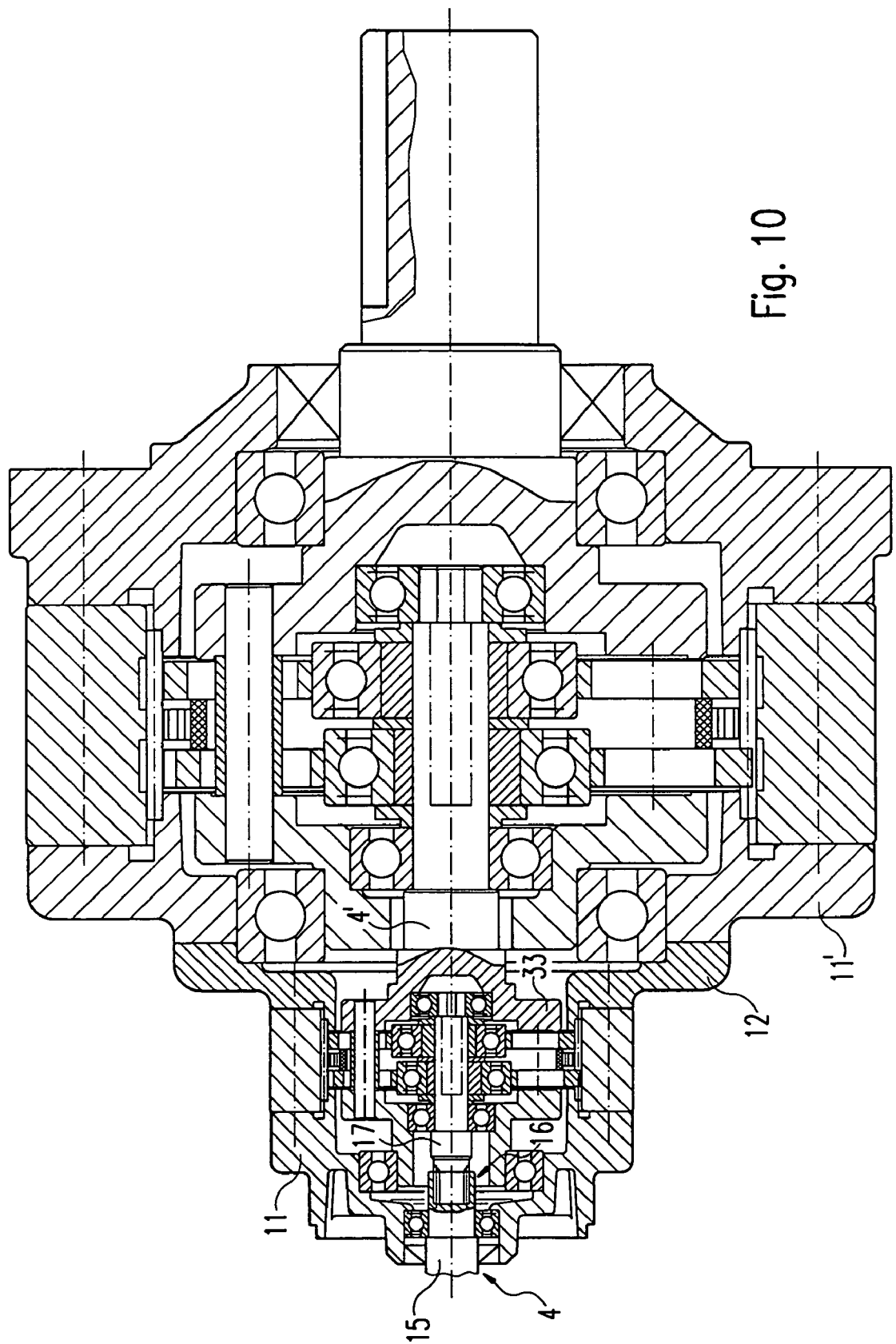
FIG. 10 shows an embodiment of a two-stage planetary gear system, represented as shown in FIG. 3.

The embodiment shown in FIG. 10 is a two-stage cycloid gear system in which the connecting device 16, provided to connect the motor shaft 15 to the planetary-gear carrier 17 in the first gear stage, is constructed as a plug-in connector. All the structural elements of this first gearing stage, apart from the second housing cover 12 and the second shaft 5 with attached outer driving part 33, can be taken from a first size category, whereas the second gear stage (shown on the right in FIG. 10) can be taken from a second size category, in which only the first shaft 4' and the first housing cover 11' have dimensions different from those of a single-stage gear system in this size category.

Figure 11:
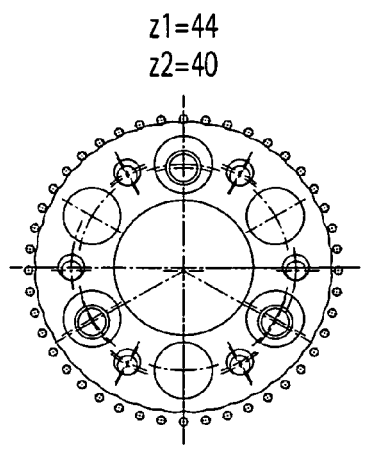
FIGS. 11, 12 and 13 are plan views of planetary gears, represented as in FIG. 3, with different numbers of teeth but the same number of external rollers and the same diameter, and hence the same internal gear.
Figure 12:
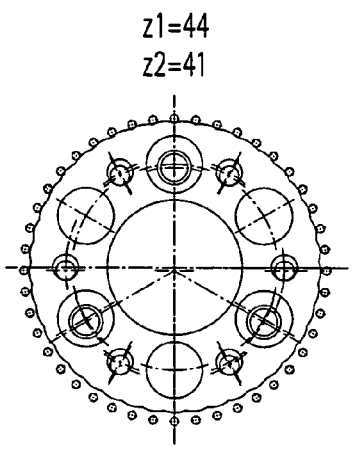
Figure 13:
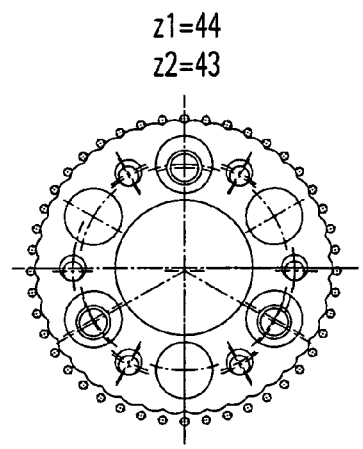

In the embodiments of the planetary gears according to FIGS. 11, 12 and 13, cycloid disks with different numbers of teeth are shown, each of which runs within the same internal gear with the same number of external rollers. When these planetary gears are incorporated into a gear train with otherwise identical components, different transmission ratios will be obtained.

Figure 14:
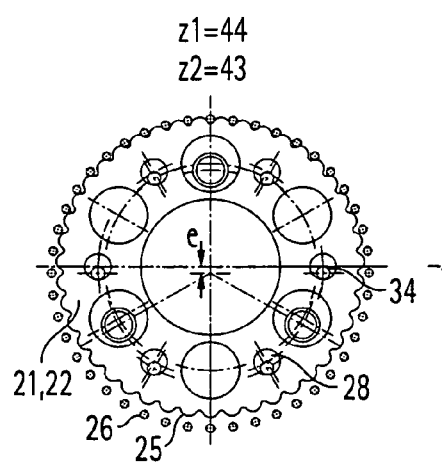
FIGS. 14, 15 and 16 are plan views of planetary gears, represented as in FIG. 3, with different diameters of the driving pins and different eccentricities e of the driving-pin axes, but the same number of external rollers and the same number of teeth.
Figure 15:
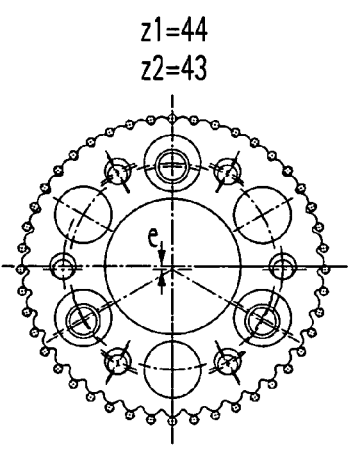
Figure 16:
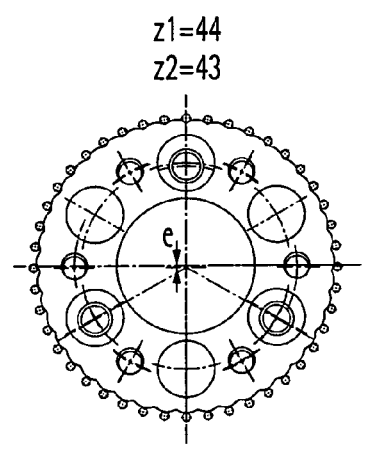

In the planetary-gear embodiments shown in FIGS. 14, 15 and 16, which run in internal gears, the internal gears are all the same, as are the external rollers and the number of teeth in the planetary gears. The difference is that the diameter of the driving pins 34 increases, while the diameter of the driving bores 28 remains constant and the eccentricity e (of the eccentric elements 3, not shown here) decreases from FIG. 14 to FIG. 16; the result is that the maximal transmissible moment of torque decreases but the quietness of running is increased, i.e. the ripples in the torque are reduced.

It will already be evident from the foregoing description that the series of gearboxes disclosed here comprises a plurality of individual components that can be retained when constructing different variants within a given overall size category, but can also be used for constructions in different size categories in order to "adjust" certain parameters, which include in particular, of course, the transmission ratio and the transmissible moment of torque, but also the running properties (quietness).

An example of a gearbox series is explained with reference to the following table, which shows a series of transmission numbers that can be implemented with a casing having N =72 grooves. The difference lies in the proportion of grooves occupied by external rollers: every groove (subsequence S index 3 with z1 =72), or only every second one (subsequence S index 2 with z2 =36), or only every third one (subsequence S index 1 with z1 =24). Here, again it should be pointed out that in gear systems such that not all the grooves are occupied by external rollers, during manufacture the grooves can be either completely eliminated or not fully finished (i.e., included only during casting).

| | is2 | | | | | | | | | | | | | | | | |
|---|---|---|---|---|---|---|---|---|---|---|---|---|---|---|---|---|---|
| | −3 | | −5 | | −7 | | −8 | | −11 | | −17 | | −23 | | −35 | | −71 | |
| | $Z_2$ | $Z_1$ | $Z_2$ | $Z_1$ | $Z_2$ | $Z_1$ | $Z_2$ | $Z_1$ | $Z_2$ | $Z_1$ | $Z_2$ | $Z_1$ | $Z_2$ | $Z_1$ | $Z_2$ | $Z_1$ | $Z_2$ | $Z_1$ |
| $S_1$ | 18 | 72 | 20 | 72 | 21 | 72 | | | 22 | 72 | | | 23 | 72 | | | | |
| $S_2$ | 27 | 36 | 30 | 36 | | | 32 | 36 | 33 | 36 | 34 | 36 | " | | 35 | 36 | | |
| $S_3$ | 54 | 24 | 60 | 24 | 63 | 24 | 64 | 24 | 66 | 24 | 68 | 24 | 69 | 24 | 70 | 24 | 71 | 24 |

From this complete series provided to the user, the particular implementation is selected that is most suitable to optimize one or more physical quantities, such as quiet running, noises or oscillations, maximal transmissible moment of torque or the like.

The following Table B presents an example of optimization with respect to the maximal transmissible moment of torque, which is found by selecting the smallest tooth-number differences:

| is2 | | | | | | | | | | | | | | | | | |
|---|---|---|---|---|---|---|---|---|---|---|---|---|---|---|---|---|---|
| −3 | | −5 | | −7 | | −8 | | −11 | | −17 | | −23 | | −35 | | −71 | |
| Z2 | Z1 | Z2 | Z1 | Z2 | Z1 | Z2 | Z1 | Z2 | Z1 | Z2 | Z1 | Z2 | Z1 | Z2 | Z1 | Z2 | Z1 |
| 18 | 24 | 20 | 24 | 21 | 24 | 32 | 36 | 22 | 24 | 34 | 36 | 23 | 24 | 35 | 36 | 71 | 72 |

List of Reference Numerals

2 Internal gear
3 Eccentric element
4 First shaft
5 Second shaft
6 First outer bearing
8 Second outer bearing
9 Second inner bearing 10 Housing
11 First housing cover
12 Second housing cover
13 Internal-gear casing
14 Screw stud
15 Motor shaft
16 Connecting device
17 Planetary-gear carrier
18 First carrier bearing
19 Second carrier bearing
20 Planetary-gear bearing
21 Planetary gear
22 Planetary gear
25 Planetary-gear tooth
26 External roller
27 Through-bore
28 Driving bore
29 Groove
30 Output drive system
31 Rod
32 Spacer sleeve
33 Outer driving part
33' Inner driving part
34 Driving pin
35 Spacer disk

The invention claimed is:

1. A gearbox series, comprising:
a plurality of gearboxes, including a first gearbox and a second gearbox, each of said plurality of gearboxes comprising at least one transmission stage comprising a first gear and a second gear that meshes with said first gear, one of said first gear and said second gear being a lantern gear and the other of said first gear and said second gear being a spur gear, wherein
said lantern gear of said first gearbox has a number $z_{1,1}$ of rods, each of said $z_{1,1}$ rods constituting a respective tooth of said lantern gear of said first gearbox, a number $z_{0,1}$ of groove positions regularly spaced along a circumference of said lantern gear of said first gearbox, said number $z_{0,1}$ is greater than 1 and is a product of two or more prime factors, and at least said number $z_{1,1}$ of grooves machined for receiving a rod constituting a tooth of said lantern gear of said first gearbox, each of said at least $Z_{1,1}$ machined grooves being machined at a respective one of said $z_{0,1}$ groove positions and each of said number $z_{1,1}$ of said at least $z_{1,1}$ machined grooves receiving a respective one of said $z_{1,1}$ rods,
said spur gear of said first gearbox has $z_{2,1}$ teeth that engage said rods of said lantern gear of said first gearbox to effect said meshing of said first and second gears of said first gearbox,
said lantern gear of said second gearbox has a number $z_{1,2}$ of rods, each of said $z_{1,2}$ rods constituting a respective tooth of said lantern gear of said second gearbox, a number $z_{0,2}$ of groove positions regularly spaced along a circumference of said lantern gear of said second gearbox, said number $z_{0,2}$ is greater than 1 and is a product of two or more prime factors, and at least said number $z_{1,2}$ of grooves machined for receiving a rod constituting a tooth of said lantern gear of said second gearbox, each of said at least $z_{1,2}$ machined grooves being machined at a respective one of said $z_{0,2}$ groove positions and each of said number $z_{1,2}$ of said at least $z_{1,2}$ machined grooves receiving a respective one of said $z_{1,2}$ rods,
said spur gear of said second gearbox has $z_{2,2}$ teeth that engage said rods of said lantern gear of said second gearbox to effect said meshing of said first and second gears of said second gearbox,
said number $z_{0,2}$ equals said number $z_{0,1}$,
said number $z_{1,2}$ and said number $z_{1,1}$ are unequal,
said number $z_{1,1}$ equals said number $z_{0,1}$ divided by $p_1$,
said number $z_{1,2}$ equals said number $z_{0,2}$ divided by $p_2$, where $p_1$ and $p_2$ are natural numbers, and
said first gearbox differs from said second gearbox with respect to at least one of a transmission ratio, a maximal transmissible moment of torque, a ripple in transmitted torque, and a quietness of running.

2. The gearbox series of claim 1, wherein
said plurality of gearboxes includes a third gearbox,
said lantern gear of said third gearbox has a number $z_{1,3}$ of rods, each of said $z_{1,3}$ rods constituting a respective tooth of said lantern gear of said third gearbox, a number $z_{0,3}$ of groove positions regularly spaced along a circumference of said lantern gear of said third gearbox, said number $z_{0,3}$ is greater than 1 and is a product of two or more prime factors, and at least said number $z_{1,3}$ of grooves machined for receiving a rod constituting a tooth of said lantern gear of said third gearbox, each of said at least $z_{1,3}$ machined grooves being machined at a respective one of said $z_{0,3}$ groove positions and each of said number $z_{1,3}$ of said at least $z_{1,3}$ machined grooves receiving a respective one of said $z_{2,3}$ rods,
said spur gear of said third gearbox has $z_{2,3}$ teeth that engage said rods of said lantern gear of said third gearbox to effect said meshing of said first and second gears of said third gearbox,
said number $z_{0,3}$ equals said number $z_{0,1}$,
said number $z_{1,3}$ differs from said number $z_{1,2}$ and said number $z_{1,1}$,
said number $z_{1,3}$ equals said number $z_{0,1}$ divided by $p_3$, where $p_3$ is a natural number, and
said third gearbox differs from said first gearbox and said second gearbox with respect to at least one of a transmission ratio, a maximal transmissible moment of torque, a ripple in transmitted torque, and a quietness of running.

3. The gearbox series of claim 1, wherein said first gear and said second gear mesh in one of an epicyclic gearing arrangement, a hypocyclic gearing arrangement and a pericyclic gearing arrangement.

4. The gearbox series of claim 1, wherein one of said first gear and said second gear is an external gear and the other of said first gear and said second gear is an internal gear.

5. The gearbox series of claim 4, wherein each of said plurality of gearboxes comprises a casing, an interior of which casing constitutes said internal gear.

6. The gearbox series of claim 5, wherein said internal gear of said first gearbox and said internal gear of said second gearbox have a substantially identical internal diameter.

7. A gearbox series, comprising:
a plurality of gearboxes, including a first gearbox, a second gearbox and a third gearbox, each of said plurality of gearboxes comprising at least one transmission stage comprising a first gear and a second gear that meshes with said first gear, one of said first gear and said second gear being a lantern gear and the other of said first gear and said second gear being a spur gear, wherein
said lantern gear of said first gearbox has a number $z_{1,1}$ of rods, each of said $z_{1,1}$ rods constituting a respective tooth of said lantern gear of said first gearbox, a number $z_{0,1}$ of groove positions regularly spaced along a circumference of said lantern gear of said first gearbox, said number $z_{0,1}$ is greater than 1 and is a product of two or more prime factors, and at least said number $z_{1,1}$ of grooves machined for receiving a rod constituting a tooth of said lantern gear of said first gearbox, each of said at least $z_{1,1}$ machined grooves being machined at a respective one of said $z_{0,1}$ groove positions and each of said number $z_{1,1}$ of said at least $z_{1,1}$ machined grooves receiving a respective one of said $z_{1,1}$ rods, said spur gear of said first gearbox has $z_{2,1}$ teeth that engage said rods of said lantern gear of said first gearbox to effect said meshing of said first and second gears of said first gearbox, said lantern gear of said second gearbox has a number $z_{1,2}$ of rods, each of said $z_{1,2}$ rods constituting a respective tooth of said lantern gear of said second gearbox, a number $z_{0,2}$ of groove positions regularly spaced along a circumference of said lantern gear of said second gearbox, said number $z_{0,2}$ is greater than 1 and is a product of two or more prime factors, and at least said number $z_{1,2}$ of grooves machined for receiving a rod constituting a tooth of said lantern gear of said second gearbox, each of said at least $z_{1,2}$ machined grooves being machined at a respective one of said $z_{0,2}$ groove positions and each of said number $z_{1,2}$ of said at least $z_{1,2}$ machined grooves receiving a respective one of said $z_{1,2}$ rods, said spur gear of said second gearbox has $z_{2,2}$ teeth that engage said rods of said lantern gear of said second gearbox to effect said meshing of said first and second gears of said second gearbox, said lantern gear of said third gearbox has a number $z_{1,3}$ of rods, each of said $z_{1,3}$ rods constituting a respective tooth of said lantern gear of said third gearbox, a number $z_{0,3}$ of groove positions regularly spaced along a circumference of said lantern gear of said third gearbox, said number $z_{0,3}$ is greater than 1 and is a product of two or more prime factors, and at least said number $z_{1,3}$ of grooves machined for receiving a rod constituting a tooth of said lantern gear of said third gearbox, each of said at least $z_{1,3}$ machined grooves being machined at a respective one of said $z_{0,3}$ groove positions and each of said number $z_{1,3}$ of said at least $z_{1,3}$ machined grooves receiving a respective one of said $z_{1,3}$ rods, said spur gear of said third gearbox has $z_{2,3}$ teeth that engage said rods of said lantern gear of said third gearbox to effect said meshing of said first and second gears of said third gearbox, said number $z_{0,1}$, said number $z_{0,2}$ and said number $z_{0,3}$ are equal, said number $z_{1,1}$, said number $z_{1,2}$ and said number $z_{1,3}$ are equal, said number $z_{2,1}$, said number $z_{2,2}$ and said number $z_{2,3}$ constitute a first degree arithmetic series, and said first gearbox, said second gearbox and said third gearbox are mutually different with respect to at least one of a transmission ratio, a maximal transmissible moment of torque, a ripple in transmitted torque, and a quietness of running.

8. The gearbox series of claim 7, wherein said first gear and said second gear mesh in one of an epicyclic gearing arrangement, a hypocyclic gearing arrangement and a pericyclic gearing arrangement.

9. The gearbox series of claim 7, wherein one of said first gear and said second gear is an external gear and the other of said first gear and said second gear is an internal gear.

10. The gearbox series of claim 9, wherein each of said plurality of gearboxes comprises a casing, an interior of which casing constitutes said internal gear.

11. The gearbox series of claim 10, wherein said internal gear of said first gearbox and said internal gear of said second gearbox have a substantially identical internal diameter.

* * * * *